(12) United States Patent
Addison et al.

(10) Patent No.: US 10,067,814 B2
(45) Date of Patent: Sep. 4, 2018

(54) METHOD AND SYSTEM TO DECREASE MEASURED USAGE LICENSE CHARGES FOR DIAGNOSTIC DATA COLLECTION

(71) Applicant: International Business Machines Corporation, Armonk, NY (US)

(72) Inventors: Edward A. Addison, Raleigh, NC (US); William J. Bulfin, Hillsborough, NC (US); Andre C. Clark, Morrisville, NC (US); Suzanne L. DeMarrais, Cary, NC (US); Peggy A. DeVal, Raleigh, NC (US); Scott W McClure, Franklin, NC (US); Andrew Wright, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 15/140,655

(22) Filed: Apr. 28, 2016

(65) Prior Publication Data

US 2017/0315852 A1    Nov. 2, 2017

(51) Int. Cl.
*G06F 11/00* (2006.01)
*G06F 11/07* (2006.01)
(Continued)

(52) U.S. Cl.
CPC .......... *G06F 11/079* (2013.01); *G06F 9/5027* (2013.01); *G06F 11/0751* (2013.01);
(Continued)

(58) Field of Classification Search
CPC ............. G06F 11/3089; G06F 11/3636; G06Q 30/0283; G06Q 30/04
See application file for complete search history.

(56) References Cited

U.S. PATENT DOCUMENTS 8,495,207 B2 * 7/2013 Lee .................... H04L 41/0896
370/241
8,849,825 B1 * 9/2014 McHugh ............ G06F 17/3023
707/737
(Continued)

OTHER PUBLICATIONS

Addison, et al.,"Method and System to Decrease Measured Usage License Charges for Diagnostic Data Collection", U.S. Appl. No. 15/140,658, filed Apr. 28, 2016.
(Continued)

*Primary Examiner* — Charles Ehne
(74) *Attorney, Agent, or Firm* — Cantor Colburn LLP

(57) ABSTRACT

Techniques are provided for executing a software product that includes a plurality of machine instructions and that is associated with a measured usage pricing model. The executing of the software product includes tracking the usage of one or more computing resources for executing the software product in accordance with the associated measured pricing model. The executing also includes, for each of multiple sets of machine instructions, determining whether the set is associated with a token indicating that the set is a set of diagnostic machine instructions related to the executing of the software product. For each of those multiple sets of machine instructions, the executing of the software product further includes, responsive to a determination that the set of machine instructions is associated with the token, not tracking the usage of the one or more computing resources during execution of that set of diagnostic machine instructions.

20 Claims, 4 Drawing Sheets

(51) Int. Cl.
*G06F 9/50* (2006.01)
*G06Q 30/02* (2012.01)
*G06F 11/36* (2006.01)
*G06F 11/30* (2006.01)

(52) U.S. Cl.
CPC ...... *G06F 11/3089* (2013.01); *G06F 11/3636* (2013.01); *G06Q 30/0283* (2013.01); *G06Q 2220/18* (2013.01)

(56) References Cited

U.S. PATENT DOCUMENTS

| | | | | |
|---|---|---|---|---|
| 9,183,049 | B1 * | 11/2015 | Corley | G06F 9/48 |
| 9,223,621 | B1 * | 12/2015 | Corley | G06F 9/5055 |
| 2006/0075079 | A1 * | 4/2006 | Powers | G06F 9/5072 |
| | | | | 709/220 |
| 2009/0049443 | A1 * | 2/2009 | Powers | G06F 9/505 |
| | | | | 718/100 |
| 2009/0276771 | A1 * | 11/2009 | Nickolov | G06F 9/4856 |
| | | | | 717/177 |

OTHER PUBLICATIONS

Addison, et al., "Method and System to Decrease Measured Usage License Charges for Diagnostic Data Collection", U.S. Appl. No. 15/293,898, filed Oct. 14, 2016.

List of IBM Patents or Patent Applications Treated as Related, U.S. Appl. No. 15/140,655, filed Apr. 28, 2016, 2 Pages.

IBM.com, (online); (retrieved on Jun. 16, 2016); retrieved from the Internet http://www-03.ibm.com/systems/z/hardware/features/ziip/ "IBM z Systems Integrated Information Processor (zIIP)"; 2016; 3 pages.

"Opening the CICS Diagnostics Toolbox", IBM Corporation; Copyright 2014; 18 pages.

IBM.com, (online); (retrieved on Jun. 16, 2016); retrieved from the Internet http://www-03.ibm.com/systems/z/hardware/features/zaap/ "z Systems Application Assist Processor (zAAP)", 2016; 3 pages.

Edward A. Addison, et al., "Method and System to Decrease Measured Usage License Charges for Diagnostic Data Collection", U.S. Appl. No. 15/140,655, filed Apr. 28, 2016.

List of IBM Patents or Patent Applications Treated as Related; Date Filed: Apr. 28, 2016, p. 1-2.

* cited by examiner

METHOD AND SYSTEM TO DECREASE MEASURED USAGE LICENSE CHARGES FOR DIAGNOSTIC DATA COLLECTION

BACKGROUND

This disclosure relates to a method and a system to decrease measured usage license charges for diagnostic data collection.

Much of the software used on mainframe computers, minicomputers, work stations, and personal computers consists of proprietary software licensed from software vendors. Like book publishers, many software vendors retain the copyright on their products, and a software product license usually restricts the licensee's use of the product in several ways.

Certain software products may be obtained under a perpetual license, which is equivalent to buying a copy of a book. However, a software product may also be licensed based on appropriate usage metrics associated with amounts of defined computing resources utilized by the software product during execution. For example, a sorting product might be licensed based on how many sort operations the licensee uses it for. Alternatively, such software may be licensed based on the number of bytes of data sorted, on the number of records sorted, or on some combination of these factors. A product providing database inquiry capability might be licensed based on the number of inquiries performed, perhaps weighted by the complexity level of each inquiry. A product that performs a number of disparate scientific or engineering calculations might assign a charge-value for each type of calculation and base license fees on the aggregate of these values. Alternatively, the software product may instead simply keep track of the total CPU-time used in performing calculations and base licenses on this value.

The collection and capture of diagnostic data for software products is often advantageous for averting errors or unexpected results in a computing environment. Time and resources are typically spent determining the root cause of the error or unexpected result. Typically, insufficient documentation is collected on the operating systems to allow a complete diagnosis to be performed. Clients and testers are required to recreate error situations to attempt to gather additional documentation on a subsequent failure. By the time a software problem percolates up to the operating system, making itself known, the initial problem may have already disappeared from traces, making the debugging of the initial problem difficult. In contrast, First Failure Data Capture (FFDC) typically reduces corresponding Hours Per Problem (HPP) required to diagnose errors or unexpected results.

Thus, capturing diagnostic data during the initial occurrence of an error or unexpected result may be advantageous in various manners, including to prevent a user or customer of such software from spending additional time and resources to recreate the error or unexpected result. However, such diagnostic data capture results in additional computing resource usage, and may therefore result in additional monetary usage fees according to a measured usage pricing model associated with the applicable software license. Consequently, users of such software may be averse to invoking diagnostic data collection in an attempt to avoid the additional monetary usage fees associated with the resultant increased usage of computing resources. This aversion may hinder software support efforts, and often requires the customer to recreate a problem with appropriate diagnostics in place, which defeats the point of First Failure Data Capture (FFDC).

Accordingly, it is an object of the invention to provide a method and system to alleviate disincentives associated with invoking diagnostic data collection for software associated with measured usage pricing models.

SUMMARY

According to at least one embodiment, a computer-implemented method comprises executing, by one or more computer processors, a software product that includes a plurality of machine instructions and that is associated with a measured usage pricing model. The executing of the software product includes tracking the usage of one or more computing resources for executing the software product in accordance with the associated measured pricing model. The executing also includes, for each of multiple sets of machine instructions, determining whether the set is associated with a token indicating that the set is a set of diagnostic machine instructions related to the executing of the software product. For each of those multiple sets of machine instructions, the executing of the software product further includes, responsive to a determination that the set of machine instructions is associated with the token, not tracking the usage of the one or more computing resources during execution of that set of diagnostic machine instructions.

According to another embodiment, a non-transitory computer-readable storage medium has computer-readable program code stored thereon that, when executed, performs a method. The method is implemented by one or more computer processors, and comprises executing a software product that includes a plurality of machine instructions and that is associated with a measured usage pricing model. The executing of the software product includes tracking the usage of one or more computing resources for executing the software product in accordance with the associated measured pricing model and, for each of multiple sets of machine instructions, determining whether the set is associated with a token indicating that the set is a set of diagnostic machine instructions related to the executing of the software product. The executing of the software product further includes, responsive to a determination that the set is associated with the token indicating that the set is a set of diagnostic machine instructions, not tracking the usage of the one or more computing resources during execution of that set of diagnostic machine instructions.

According to another embodiment, a system comprises a processor, a system memory, and a bus that couples various system components (including the system memory) to the processor. The system is configured to perform a method that includes executing a software product that includes a plurality of machine instructions and that is associated with a measured usage pricing model. The executing of the software product includes tracking the usage of one or more computing resources for executing the software product in accordance with the associated measured pricing model and, for each of multiple sets of machine instructions, determining whether the set is associated with a token indicating that the set is a set of diagnostic machine instructions related to the executing of the software product. The executing of the software product further includes, responsive to a determination that the set is associated with the token indicating that the set is a set of diagnostic machine instructions, not tracking the usage of the one or more computing resources during execution of that set of diagnostic machine instructions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Figure 1:
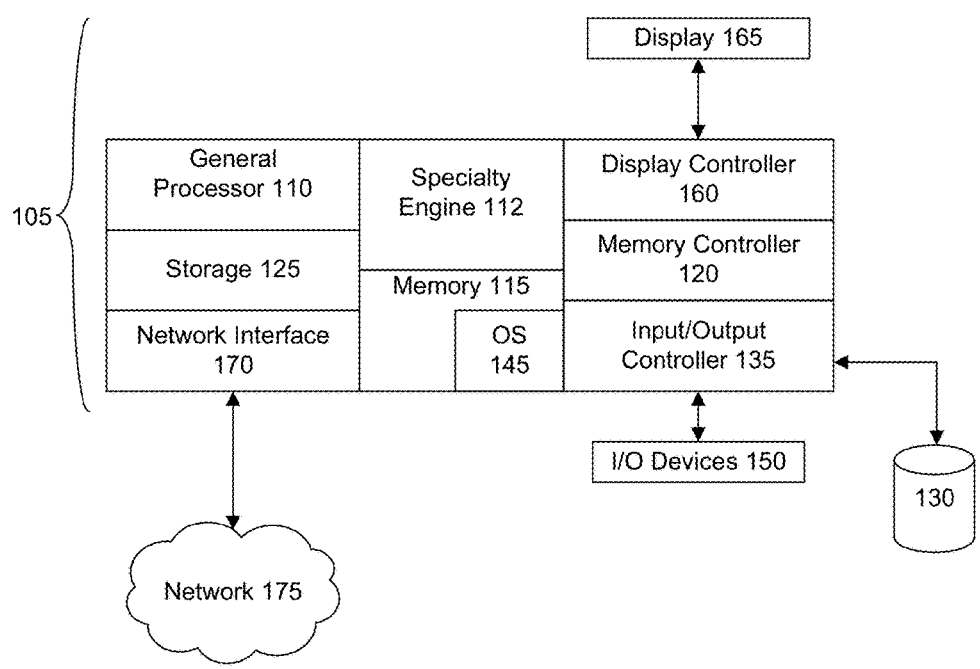
FIG. 1 depicts a block diagram of a database system in accordance with an embodiment.

Embodiments disclosed herein enable the reduction or elimination of user disincentives from utilizing diagnostic data collection or other diagnostic instructions during the execution of software products associated with measured usage pricing models.

As one example, prior to invoking diagnostic data collection for a software product that is associated with a measured usage pricing model and being executed by one or more general processors, individual instructions (or sets of such instructions) associated with such diagnostic data collection may be offloaded for execution by a specialty engine that includes one or more specialty processors. In at least some embodiments, the computing resources used for execution by the specialty engine do not incur monetary usage fees associated with the measured usage pricing model for execution of the software product by the one or more general processors. In other embodiments, the computing resources used for execution by the specialty engine incur monetary usage fees that are less than those associated with the measured usage pricing model for execution of the software product by the one or more general processors.

As used herein, the terms "general processor" and "general-purpose processor" refers to a processor that is available to the general operating system (OS) and application software. The term "specialty processor" refers to a hardware processor that is configured to process a specific type of workload. In general, specialty processors may cost less than mainframe general processors to purchase and may be less expensive than mainframe general processors to maintain due, at least in part, to the way that they are treated in software pricing calculations. The term "specialty engine" refers to a processing engine (implemented via hardware, software, or combination thereof) that includes one or more specialty processors. Also, as used herein, the term "measured usage pricing model" and "measured usage license" may, unless the context clearly indicates otherwise, be used interchangeably and refer to any software license in which monetary usage fees are incurred based on an amount of computing resources utilized during execution of an associated software product.

Typically, a specialty processor has an instruction set capable of performing emulation of the System z architecture (i.e., the primary system architecture of the mainframe, System z processors). Generally, contemporary general purpose processors include sufficient instructions such that software enablement, working in conjunction with the processor, can emulate all necessary instructions provided on the System z mainframe. There are currently several PC emulators available that support System/390® and z/Architecture® that can perform the type of software emulation described herein. Furthermore, particular embodiments may utilize architecture other than the System z architecture, and unless context clearly indicates otherwise, embodiments described herein are not limited to any single particular system architecture. In certain embodiments, a "specialty processor" may be distinguished by its instruction set architecture being physically or logically constrained in firmware such that it does not support the primary computing architecture of the system being emulated natively or completely. Nominally, these specialty processors are from a commodity class of processors available at lower cost than those of special purpose mainframe processors for instance.

In other embodiments, rather than offloading execution of diagnostic data collection instructions to specialty processors and/or specialty engine, the diagnostic data collection instructions may continue to run on the general processor in a manner that pauses any usage tracking with respect to metrics utilized to calculate monetary usage fees under any measured usage pricing model associated with the software product. For example, in certain embodiments, a token may be received by the general processor indicating that a particular set of machine instructions is a set of diagnostic machine instructions for which tracking of computer resource usage should be temporarily disabled. One or more tokens may be passed in conjunction with a diagnostic routine or other set of diagnostic machine instructions to halt usage tracking during the execution of the set of diagnostic machine instructions, with such usage tracking being resumed upon exit from the diagnostic routine or set of diagnostic machine instructions. In this manner, the system may avoid additional overhead and/or complexity associated with switching processors each time a set of diagnostic machine instructions is to be executed.

In various embodiments, the token indicating that tracking of computer resource usage should be temporarily disabled may be provided in various manners and from various sources. For example, in at least one embodiment a computing system may utilize one or more services to register client instruction code for CPU usage. As part of a set of function calls to or from such registration services, a token may be provided via an instruction to the general processor. In another embodiment, a token may be provided via microcode. In still another embodiment, a non-switched authorized computer may provide a token via the operating system. In any of these circumstances, receiving the token would in turn be used by the registration service to set an indicator to stop usage recording on entry from a diagnostic routine or other set of diagnostic machine instructions and to resume such tracking once execution of the diagnostic routine or set of diagnostic instructions is complete.

In certain embodiments, in response to receiving a token indicating that a particular set of machine instructions is a set of diagnostic machine instructions, rather than temporarily disabling usage tracking the general processor may continue to track computing resource usage, but do so in a manner that indicates association with a separate measured usage pricing model. For example, the token-indicated set of diagnostic machine instructions may be executed in a manner still associated with monetary usage fees, but that are less than those monetary usage fees associated with the execution of client code or other machine instructions.

FIG. 1 illustrates a block diagram of a computing system 100 for use in practicing the teachings herein. The methods described herein can be performed or otherwise implemented via hardware, software (e.g., firmware), or combination thereof. In an exemplary embodiment, the methods described herein are implemented in hardware, and may be part of the microprocessor of a special or general-purpose digital computer, such as a personal computer, workstation, minicomputer, or mainframe computer. The computing system 100 therefore includes computer 105.

In the illustrated embodiment of FIG. 1, the computer 105 includes a general processor 110, a specialty engine 112, a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components.

Also in the illustrated embodiment, the general processor 110 is a hardware device for executing hardware instructions or software, particularly that stored in memory 115. The general processor 110 can be any custom made or commercially available processor, a central processing unit (CPU), an auxiliary processor among several processors associated with the general-purpose computer 105, a semiconductor based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 1, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to a network 175. The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions.

Figure 2:
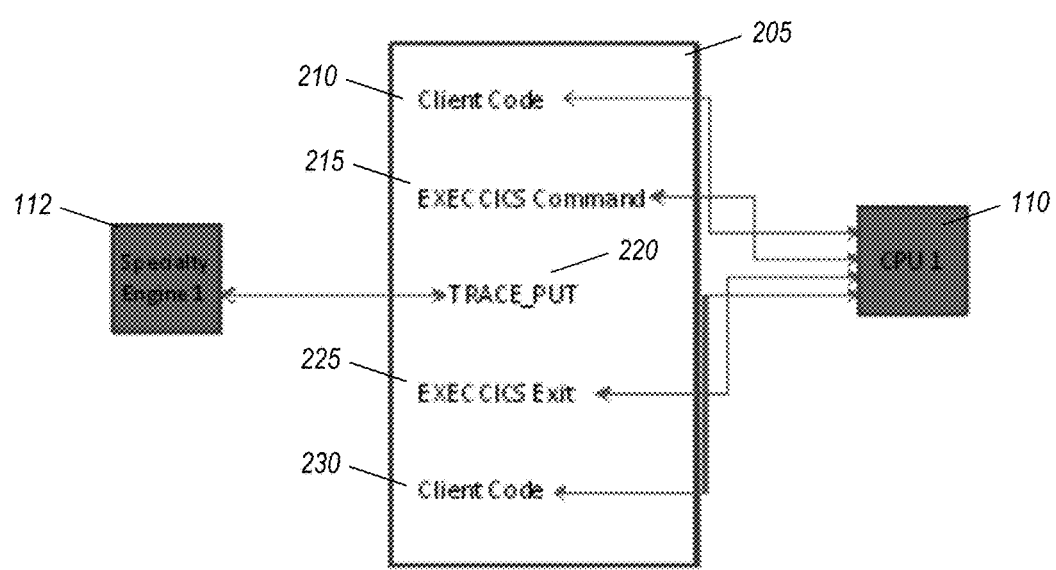
FIG. 2 depicts a usage scenario in accordance with an embodiment.

FIG. 2 depicts a usage scenario in accordance with an embodiment in which one or more sets of diagnostic machine instructions are transferred by a general processor 110 for processing by a specialty engine 112 comprising one or more specialty processors (not shown). In particular, a series of instructions 205 is being executed as part of executing a software product associated with a measured usage pricing model, such that monetary usage fees are incurred based on an amount of computing resources (in this example, CPU time) used by the general processor 110 during such execution. The series of instructions 205 begins with client code 210, representing one or more instructions included within the software product being executed on behalf of a client.

CICS (Customer Information Control System) comprises a family of application servers and connectors that provide industrial-strength, online transaction management and connectivity for mission-critical applications. CICS includes a transaction server that runs on IBM mainframe systems under z/OS or z/VSE, but is also available for other operating systems—notably i5/OS, OS/2, and the closely related IBM TXSeries software on AIX, Windows, and Linux, among others. CICS is a transaction processing system designed for both online and batch activity. On large servers (e.g., IBM zSeries and System z9 servers), CICS easily supports thousands of transactions per second, making it a mainstay of enterprise computing. CICS applications can be written in numerous programming languages, including COBOL, PL/I, C, C++, Assembler, REXX, and Java.

Continuing with reference to FIG. 2, the series of instructions 205 next includes a CICS command 215, which in the illustrated embodiment includes a call to perform one or more diagnostic functions, including the TRACE_PUT function call 220. Here, the CICS command 215 effectively registers eligibility for the general processor 110 to transfer the subsequent set of diagnostic machine instructions (including TRACE_PUT function call 220) to specialty engine 112 for execution. In the depicted embodiment, only those machine instructions executed by the general processor 110 are tracked for purposes of measuring usage according to the measured usage pricing model associated with the software product being executed. Thus, by transferring the set of diagnostic machine instructions to the specialty engine for execution, such diagnostic machine instructions provide the benefits associated with diagnostic data collection without incurring monetary usage fees in accordance with the applicable measured usage license or, in certain embodiments, incurring monetary usage fees that are less than those associated with the applicable measured usage license.

The completed execution of the TRACE_PUT function call 220 denotes the end of the set of diagnostic machine instructions, at which point execution by general processor 110 resumes. CICS command Exit 225 denotes the end of the call to CICS, at which time the general processor therefore proceeds with executing the remaining client code, beginning with the depicted client code instruction 230.

Figure 3:
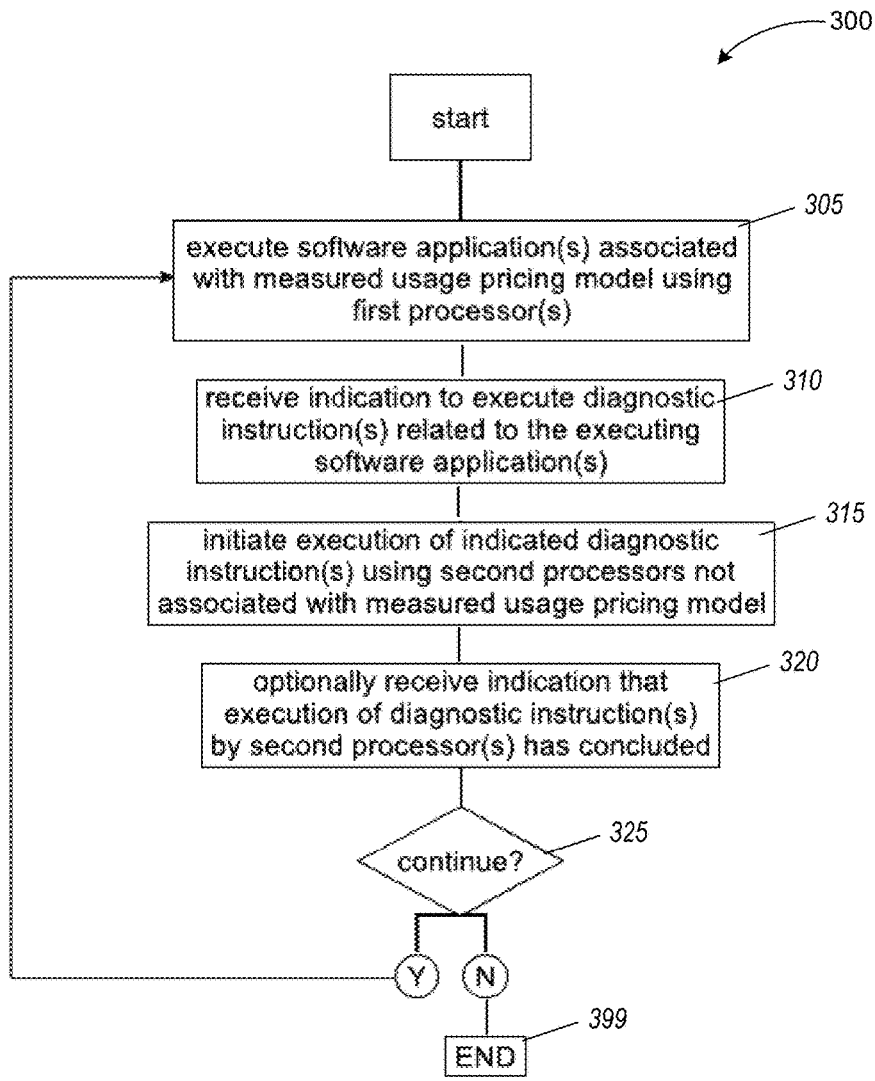
FIG. 3 depicts a process flow for software product execution in accordance with an embodiment.

FIG. 3 depicts a routine 300 for software product execution, again in accordance with an embodiment in which one or more sets of diagnostic machine instructions are transferred by a general processor for processing by a specialty engine.

The routine begins at block 305, in which one or more first processors execute one or more software applications associated with a measured usage pricing model. The routine continues at block 310, in which the one or more first processors receive an indication to execute one or more diagnostic instructions related to the executing software application(s).

At block 315, the one or more first processors initiate execution of the indicated diagnostic instructions using distinct second processors that are not associated with the measured usage pricing model.

At block 320, the one or more first processors optionally receive an indication that execution of the diagnostic instructions by the one or more second processors has concluded.

At block 325, the routine determines whether to continue, such as in response to an explicit instruction to terminate. If it is determined that the routine is to continue, the routine returns to block 305 to continue execution, by the one or more first processors, of the one or more software applications associated with the measured usage pricing model. Otherwise, the routine proceeds to block 399 and ends.

Figure 4:
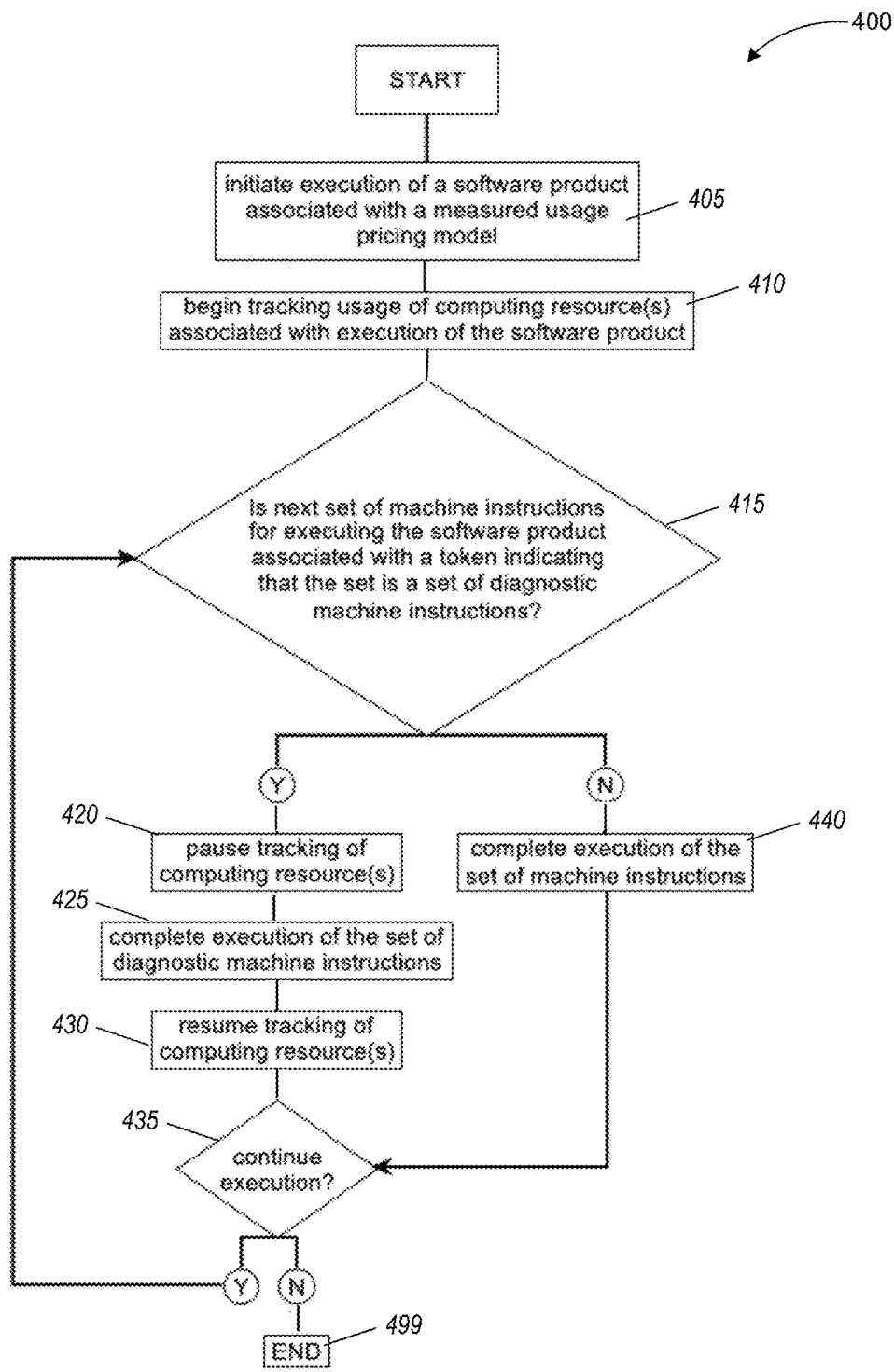
FIG. 4 depicts a process flow for software product execution in accordance with an additional embodiment.

FIG. 4 depicts a routine 400 for software product execution in accordance with an embodiment in which, rather than transfer sets of diagnostic machine instructions to a specialty engine for processing, monetary usage fees that would otherwise be associated with such sets of diagnostic machine instructions are avoided by pausing the tracking of computing resource usage during the execution of such diagnostic machine instructions.

The routine begins at block 405, in which the execution of a software product associated with a measured usage pricing model is initiated. At 410, the routine begins tracking the usage of particular computing resources associated with execution of software product.

At block 415, the routine determines whether the next set of machine instructions for executing the software product is associated with a token indicating that the set is a set of diagnostic machine instructions.

If it is determined that the next set of machine instructions is associated with such a token, the routine proceeds to block 420, and pauses the tracking of computing resource usage. At block 425, the general processor completes the execution of the set of diagnostic machine instructions that was determined to be associated with the relevant token, and at block 430 the routine resumes tracking usage of the computing resources.

If it was determined at block 415 that the next set of machine instructions is not associated with a token indicating that the set is a set of diagnostic machine instructions, the routine proceeds to 440 to execute the next set of machine instructions.

After block 430 (if it was determined at block 415 that the next set of instructions was associated with a token indicating a set of diagnostic machine instructions) or block 440 (if it was determined at block 415 that the next set of instructions was not associated with such a token), the routine proceeds to block 435 to determine whether to continue the execution of the software product. If it is determined not to continue (such as in response to an explicit instruction to terminate), the routine proceeds to 499 and ends. Otherwise, the routine returns to block 415, and again determines whether the next set of machine instructions is associated with a token indicating that the set is a set of diagnostic machine instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for improving processor performance while tracking computing resources usage comprising:
    executing by one or more computer processors a software product that includes a plurality of machine instructions and that is associated with a measured usage pricing model, the executing including:

tracking a usage of one or more computing resources for executing the software product in accordance with the measured pricing model; and for each of multiple sets of machine instructions:

determining, via the processor, whether the set of machine instructions is associated with a token indicating that the set of machine instructions is a set of diagnostic machine instructions related to the executing of the software product; and responsive to a determination that the set of machine instructions is associated with the token indicating that the set of machine instructions is a set of diagnostic machine instructions, reducing processing time for each of the multiple sets of machine instructions by not tracking the usage of the one or more computing resources during execution of the set of diagnostic machine instructions.

2. The computer-implemented method of claim 1 wherein the measured usage pricing model specifies monetary usage fees that are associated with an amount of tracked usage of the one or more computing resources for execution of the software product by the one or more computer processors.

3. The computer-implemented method of claim 2 wherein the specified monetary usage fees are associated with a predefined amount of CPU time used for the execution of the software product.

4. The computer-implemented method of claim 1 further comprising, for each of at least one set of diagnostic machine instructions, resuming the tracking of the usage of the one or more computing resources once the execution of the set of diagnostic machine instructions is completed.

5. The computer-implemented method of claim 1 wherein, for at least one of the sets of diagnostic machine instructions, determining whether the set of diagnostic machine instructions is associated with the token includes receiving the token from a registration service that manages CPU time for the one or more computer processors.

6. The computer-implemented method of claim 1 wherein the software product is a software application product, wherein executing the software application product includes executing the software application product under an operating system, and wherein, for at least one set of diagnostic machine instructions, determining that the set of diagnostic machine instructions is associated with the token includes receiving an indication of the associated token from the operating system.

7. The computer-implemented method of claim 1 wherein, for at least one set of diagnostic machine instructions, the associated token is provided to the one or more computer processors as part of a set of microcode instructions.

8. A non-transitory computer-readable storage medium having computer readable program code stored thereon that, when executed, performs a method for improving processor performance while tracking computing resource usage, the method comprising:

executing by one or more computer processors a software product that includes a plurality of machine instructions and that is associated with a measured usage pricing model, the executing including:

tracking a usage of one or more computing resources for executing the software product in accordance with the measured pricing model; and for each of multiple sets of machine instructions:

determining, via the processor, whether the set of machine instructions is associated with a token indicating that the set of machine instructions is a set of diagnostic machine instructions related to the executing of the software product; and responsive to a determination that the set of machine instructions is associated with the token indicating that the set of machine instructions is a set of diagnostic machine instructions, reducing processing time for each of the multiple sets of machine instructions by not tracking the usage of the one or more computing resources during execution of the set of diagnostic machine instructions.

9. The non-transitory computer-readable storage medium of claim 8 wherein the measured usage pricing model specifies monetary usage fees that are associated with an amount of tracked usage of the one or more computing resources for execution of the software product by the one or more computer processors.

10. The non-transitory computer-readable storage medium of claim 9 wherein the specified monetary usage fees are associated with a predefined amount of CPU time used for the execution of the software product.

11. The non-transitory computer-readable storage medium of claim 8 wherein the performed method further comprises, for each of at least one set of diagnostic machine instructions, resuming the tracking of the usage of the one or more computing resources once the execution of the set of diagnostic machine instructions is completed.

12. The non-transitory computer-readable storage medium of claim 8 wherein, for at least one of the sets of diagnostic machine instructions, determining whether the set of diagnostic machine instructions is associated with the token includes receiving the token from a registration service that manages CPU time for the one or more computer processors.

13. The non-transitory computer-readable storage medium of claim 8 wherein the software product is a software application product, wherein executing the software application product includes executing the software application product under an operating system, and wherein, for at least one set of diagnostic machine instructions, determining that the set of diagnostic machine instructions is associated with the token includes receiving an indication of the associated token from the operating system.

14. The non-transitory computer-readable storage medium of claim 8 wherein, for at least one set of diagnostic machine instructions, the associated token is provided to the one or more computer processors as part of a set of microcode instructions.

15. A computer system comprising a processor, a system memory, and a bus that couples various system components including the system memory to the processor, the system configured to perform a method for improving processor performance while tracking computing resource usage that includes:

executing by the processor a software product that includes a plurality of machine instructions and that is associated with a measured usage pricing model, the executing including:

tracking a usage of one or more computing resources for executing the software product in accordance with the measured pricing model; and for each of multiple sets of machine instructions:

determining whether the set of machine instructions is associated with a token indicating that the set of machine instructions is a set of diagnostic machine instructions related to the executing of the software product; and responsive to a determination that the set of machine instructions is associated with the token indicating that the set of machine instructions is a set of diagnostic machine instructions, reducing processing time for each of the multiple sets of machine instructions by not tracking the usage of the one or more computing resources during execution of the set of diagnostic machine instructions.

16. The computer system of claim 15 wherein the measured usage pricing model specifies monetary usage fees that are associated with an amount of tracked usage of the one or more computing resources for execution of the software product by the one or more computer processors.

17. The computer system of claim 15 further comprising, for each of at least one set of diagnostic machine instructions, resuming the tracking of the usage of the one or more computing resources once the execution of the set of diagnostic machine instructions is completed.

18. The computer system of claim 15 wherein, for at least one of the sets of diagnostic machine instructions, determining whether the set of diagnostic machine instructions is associated with the token includes receiving the token from a registration service that manages CPU time for the one or more computer processors.

19. The computer system of claim 15 wherein the software product is a software application product, wherein the computer system further includes an operating system, and wherein, for at least one set of diagnostic machine instructions, determining that the set of diagnostic machine instructions is associated with the token includes receiving an indication of the associated token from the operating system.

20. The computer system of claim 15 wherein, for at least one set of diagnostic machine instructions, the associated token is provided to the processor as part of a set of microcode instructions.

* * * * *